(12) United States Patent
Ogawa-Garcia et al.

(10) Patent No.: US 12,024,215 B2
(45) Date of Patent: Jul. 2, 2024

(54) LIFT FOR MOVING CONTAINERS

(71) Applicant: Rehrig Pacific Company, Los Angeles, CA (US)

(72) Inventors: Sydney Marie Ogawa-Garcia, Huntington Beach, CA (US); Dane Gin Mun Kalinowski, Foothill Ranch, CA (US); William Robinson, Los Angeles, CA (US); Travis James Englert, Brea, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 476 days.

(21) Appl. No.: 17/332,767

(22) Filed: May 27, 2021

(65) Prior Publication Data

US 2021/0370996 A1 Dec. 2, 2021

Related U.S. Application Data

(60) Provisional application No. 63/030,632, filed on May 27, 2020.

(51) Int. Cl.
| | | |
|---|---|---|
| *B62B 3/06* | (2006.01) | |
| *B62B 3/12* | (2006.01) | |
| *B62B 5/00* | (2006.01) | |
| *B62D 51/04* | (2006.01) | |
| *B66F 9/065* | (2006.01) | |
| *B62B 5/06* | (2006.01) | |

(52) U.S. Cl.
CPC .......... *B62B 3/0612* (2013.01); *B62B 3/0631* (2013.01); *B62B 3/12* (2013.01); *B62B 5/004* (2013.01); *B62B 5/0043* (2013.01); *B62D 51/04* (2013.01); *B66F 9/065* (2013.01); *B62B 5/063* (2013.01); *B62B 5/067* (2013.01)

(58) Field of Classification Search
CPC ...... B62B 3/0612; B62B 3/0631; B62D 51/04
See application file for complete search history.

(56) References Cited

U.S. PATENT DOCUMENTS

| | | | | |
|---|---|---|---|---|
| 2,121,764 A | * | 6/1938 | Quayle | B62B 3/0625 |
| | | | | 254/10 C |
| 2,155,580 A | * | 4/1939 | Barrett | B62B 3/0625 |
| | | | | 254/2 C |
| 2,399,043 A | * | 4/1946 | Klumb | B62B 3/0631 |
| | | | | 280/137.5 |
| 2,822,944 A | * | 2/1958 | Blomgren | B62B 3/0631 |
| | | | | 254/10 R |
| 3,836,027 A | * | 9/1974 | Gardner | B60B 29/002 |
| | | | | 254/133 R |
| 4,263,977 A | * | 4/1981 | Willett | B62D 51/04 |
| | | | | 280/282 |
| 4,522,548 A | * | 6/1985 | Oswald | B60P 3/00 |
| | | | | 414/458 |
| 5,246,081 A | * | 9/1993 | Engle | B62D 53/0864 |
| | | | | 410/67 |

(Continued)

*Primary Examiner* — Jonathan Snelting
(74) *Attorney, Agent, or Firm* — Carlson, Gaskey & Olds, P.C.

(57) ABSTRACT

A container moving assembly includes a frame with a drive wheel pivotably attached to the frame about a steering axis. A pair of guide wheels are rotatably attached relative to the frame opposite the drive wheel. A platform lifting assembly is pivotable relative to the frame and includes an engagement platform for supporting a container.

24 Claims, 13 Drawing Sheets

(56) References Cited

U.S. PATENT DOCUMENTS

| | | | |
|---|---|---|---|
| 5,633,544 A * | 5/1997 | Toida | H02K 29/08 |
| | | | 310/67 R |
| 5,655,733 A * | 8/1997 | Roach | B64F 1/22 |
| | | | 244/50 |
| 6,619,671 B1 | 9/2003 | Fine | |
| 6,739,601 B1 | 5/2004 | Fine | |
| 7,210,545 B1 * | 5/2007 | Waid | B62B 3/12 |
| | | | 180/19.1 |
| 10,377,288 B2 * | 8/2019 | Davis | B62B 3/104 |

* cited by examiner

LIFT FOR MOVING CONTAINERS

CROSS-REFERENCE TO RELATED APPLICATIONS

This application claims priority to U.S. Provisional Application No. 63/030,632, which was filed on May 27, 2020 and is incorporated herein by reference.

BACKGROUND

Large containers, such as wheeled dumpsters, regularly require moving to either fill or empty the container. When the containers are full, they can be relatively heavy to move along a floor surface without assistance. In particular, if the container is outside and exposed to wet or freezing conditions or must move along an inclined surface, multiple individuals might be needed to assist in relocating the container.

SUMMARY

A container moving assembly includes a frame with a drive wheel pivotably attached to the frame about a steering axis. A pair of guide wheels are rotatably attached relative to the frame opposite the drive wheel. A platform lifting assembly is pivotable relative to the frame and includes an engagement platform for supporting a container.

DETAILED DESCRIPTION

Figure 1:
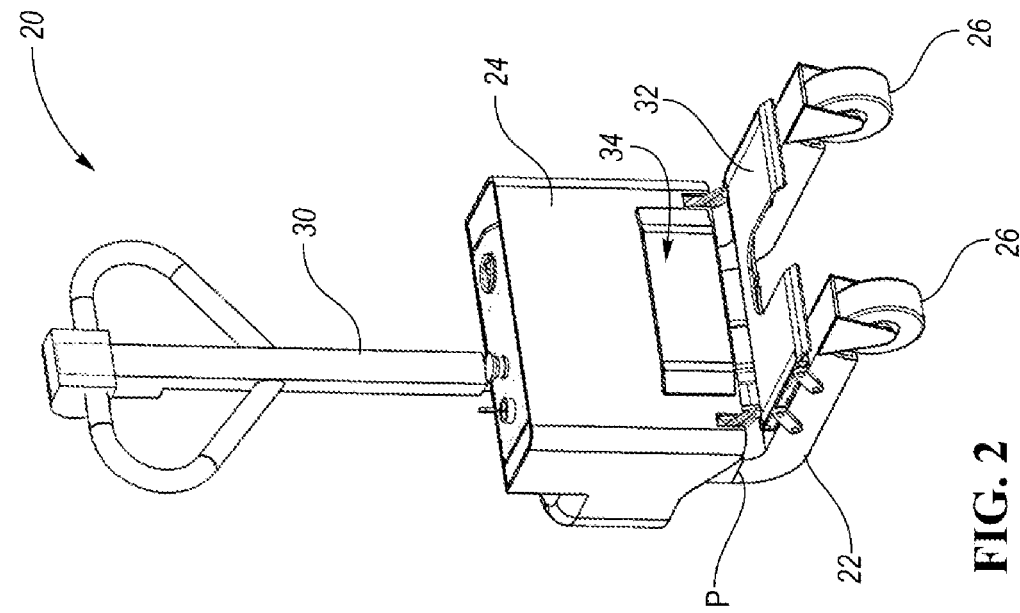
FIG. 1 illustrates a perspective view of an example container moving lift.
Figure 2:
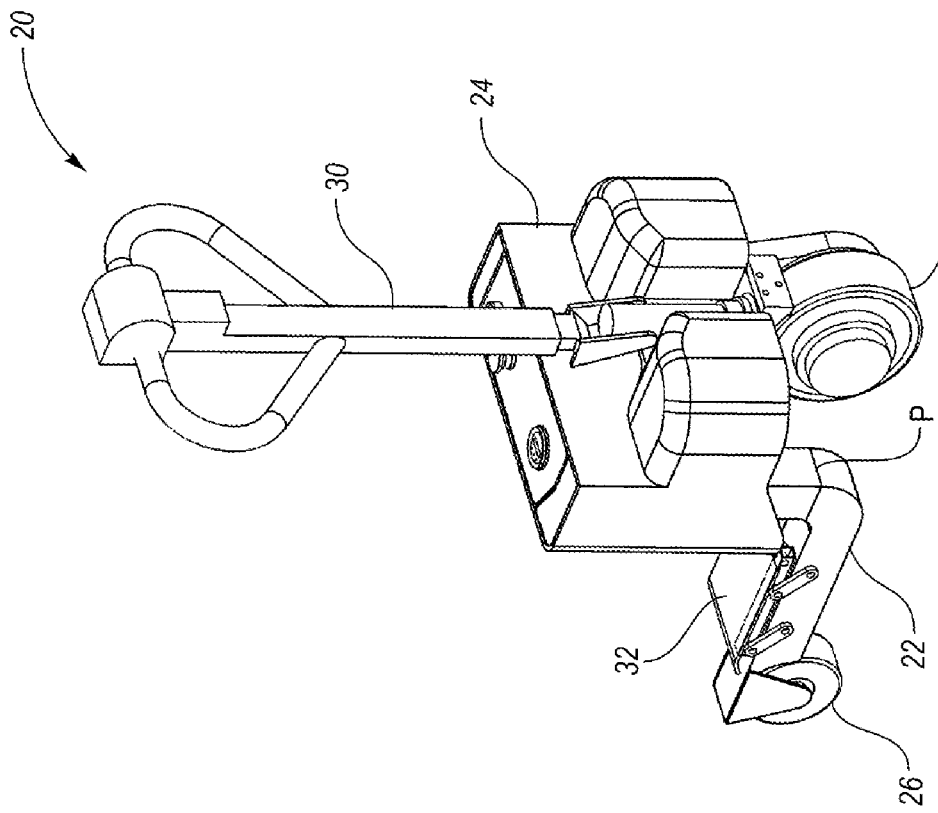
FIG. 2 illustrates another perspective view of the container moving lift of FIG. 1.

FIGS. 1 and 2 illustrate perspective views of an example container moving lift 20. One feature of the lift 20 is to assist a person trying to move a container. In particular, the lift 20 provides mechanical assistance to the user to move a container that is too heavy for the user to move alone. The lift 20 is also portable to allow it to be easily transported on a vehicle to remote locations. The ability to easily transfer the lift 20 allows for only a single operator on a vehicle to perform tasks that might have required multiple operators in the past.

In the illustrated example, the lift 20 includes a frame 22 supporting a body portion 24. The lift 20 travels on a pair of guide wheels 26 at one end and a single drive wheel 28 at another end. The pair of guide wheels 26 are rotatably attached to the frame 22 but fixed from changing direction relative to the frame 22 and the drive wheel 28 is rotatable and swivels or pivots relative to the frame 22 for maneuvering the lift 20. A user maneuvers the lift 20 through interacting with a collapsible tiller arm 30 to control a direction of the drive wheel 28. The tiller arm 30 can also include controls for selecting a rotational speed of the drive wheel 28 if desired or the tiller arm 30 can be manipulated to move the lift 20 without mechanical assistance from the drive wheel 28.

Figure 3:
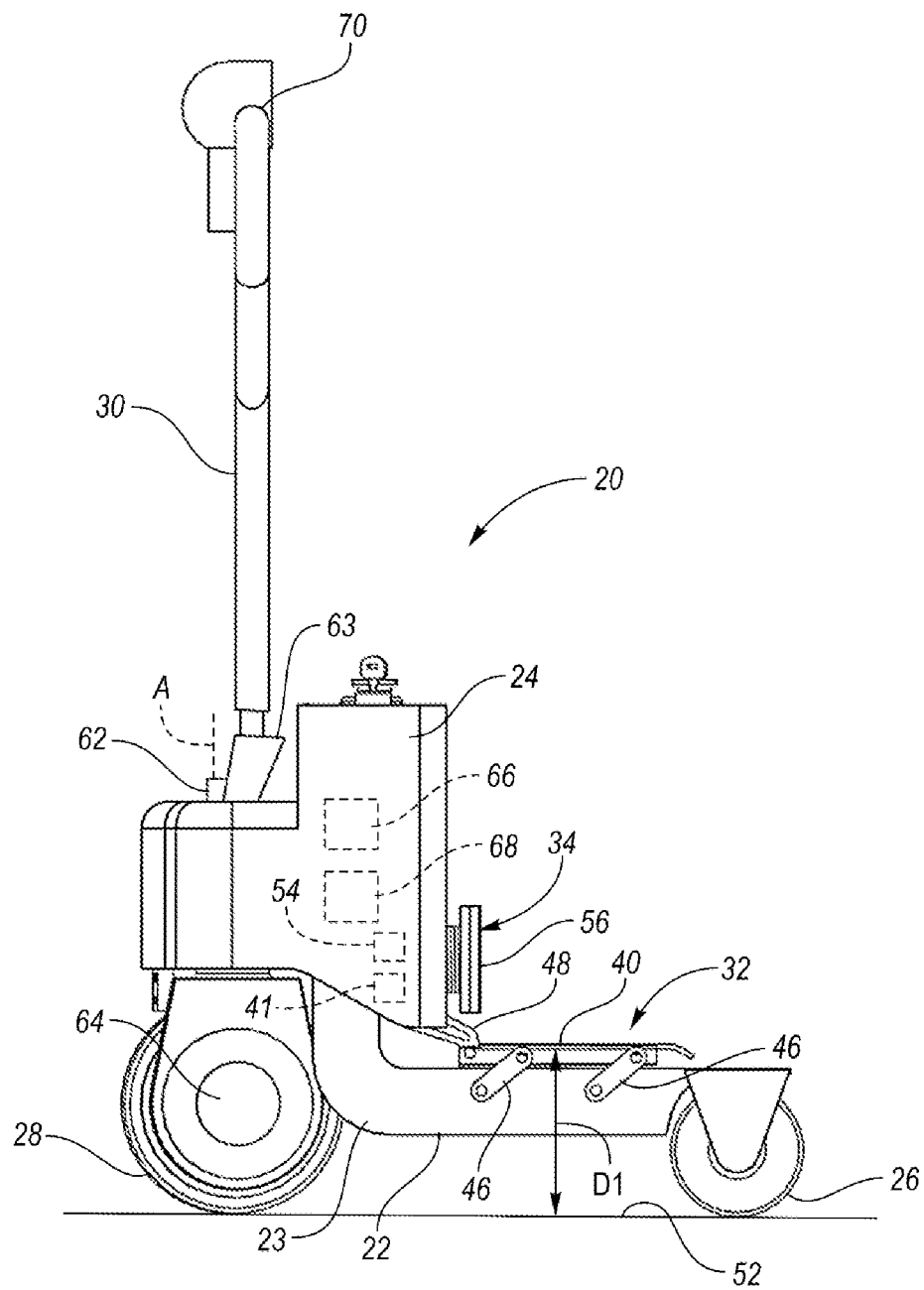
FIG. 3 illustrates a side view of the container moving lift of FIG. 1.
Figure 4:
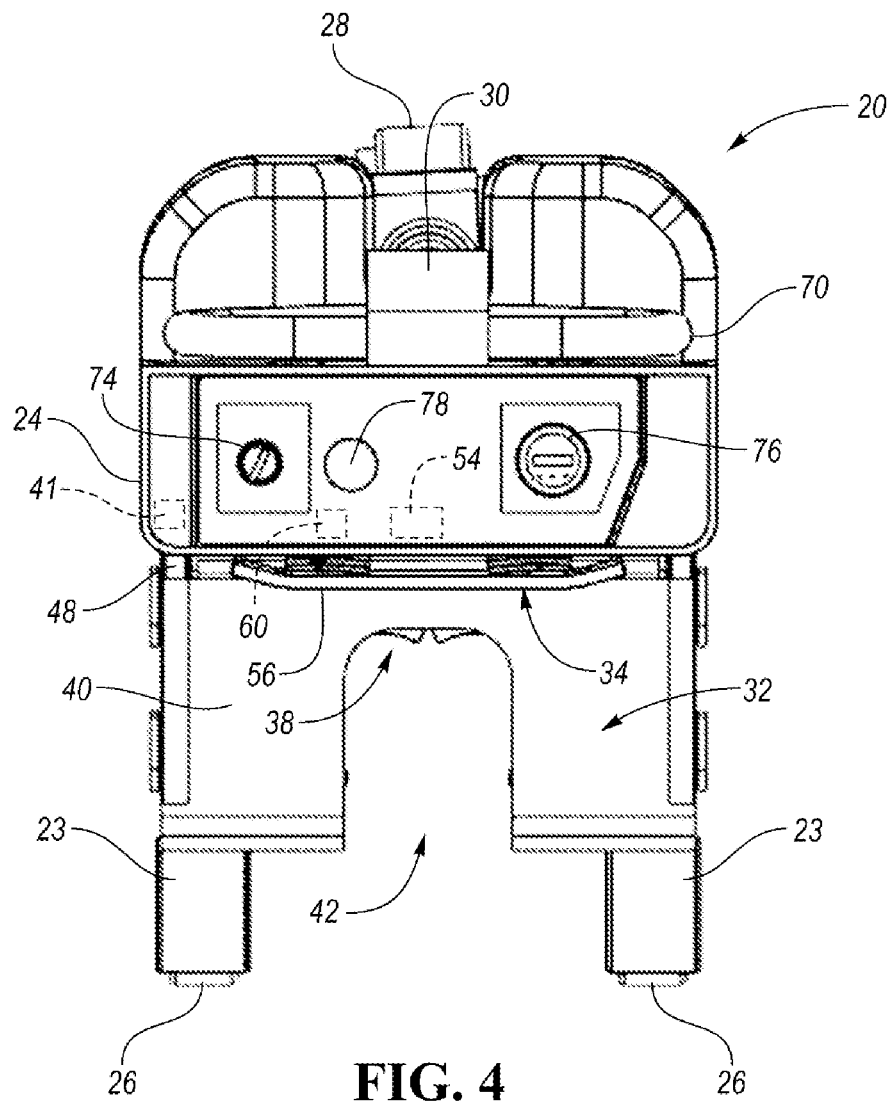
FIG. 4 illustrates a top view of the container moving lift of FIG. 1.
Figure 5:
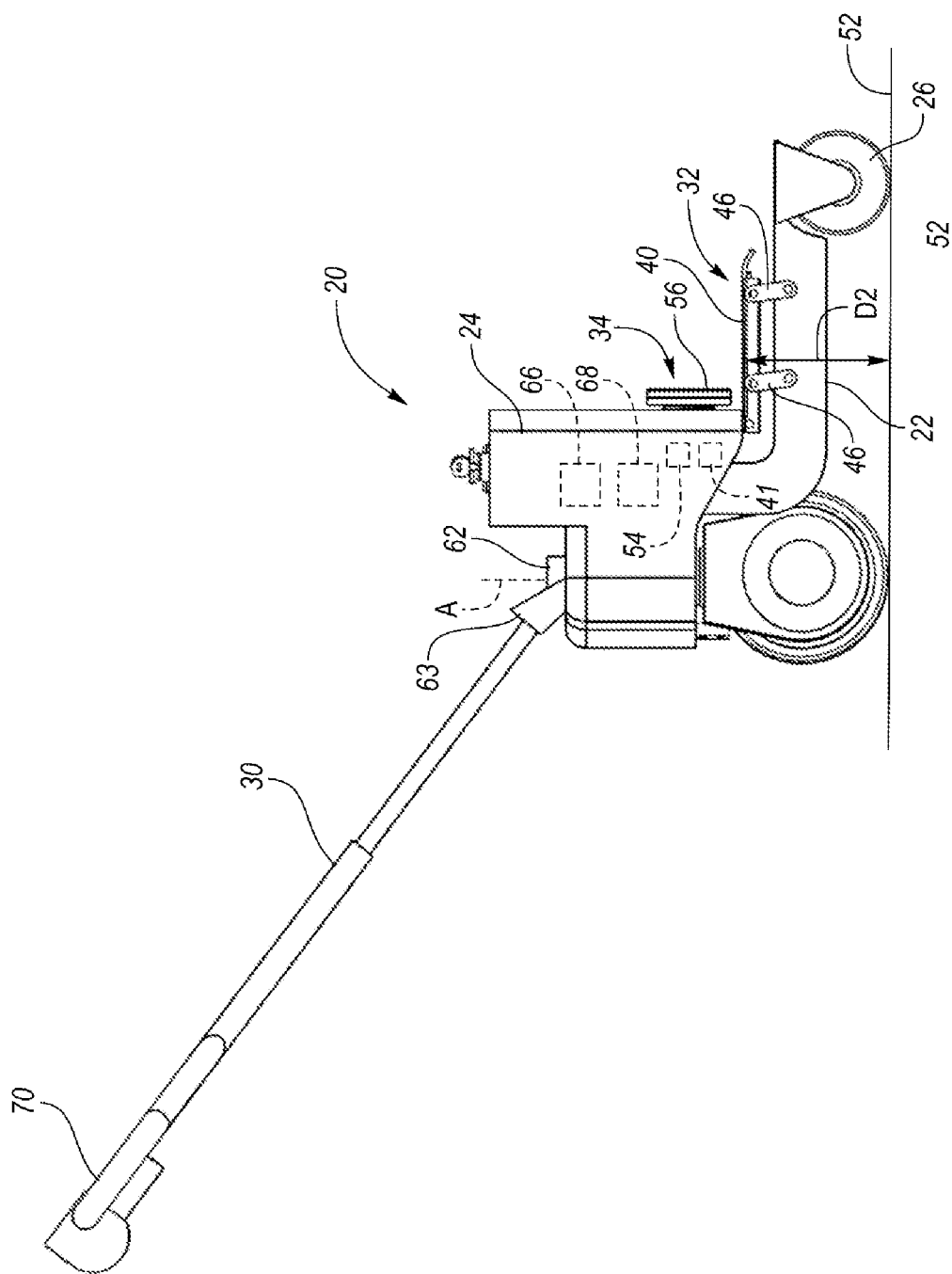
FIG. 5 illustrates another side view of the container moving lift of FIG. 1.

As shown in FIG. 3-5, the lift 20 engages a container 36 with at least one of a platform lifting assembly 32, a backrest assembly 34, or a grabbing mechanism 38. The platform lifting assembly 32 includes an engagement platform 40 and an actuator 41 for manipulating the engagement platform 40 between a retracted position (FIG. 3) to allow the lift 20 to slide under the container 36 and a raised position (FIG. 5) to engage an underside of the container 36. However, a rubber pad could be placed on the engagement platform 40 to soften the engagement with the container 36.

The engagement platform 40 is connected to a corresponding arm 23 on the frame 22 through linkages 46 that are pivotally attached to the both the arms 23 and the engagement platform 40. The engagement platform 40, the arms 23, and the linkages 46 can form a four-bar linkage. An actuator arm 48 mechanically connects the actuator 41 and the engagement platform 40 to cause the engagement platform 40 to translate relative to the frame 22 about the linkages 46. In the illustrated example, the linkages 46 include an elongated bar shape with a first opening for accepting a pin for pivotably attaching the linkage 46 directly to the frame 22 and a second opening for accepting a pin for pivotably attaching the linkage 46 directly to the engagement platform 40. The actuator 41 applies mechanical leverage, electronic control, and/or electro-hydraulic control to the engagement platform 40 through the actuator arm 48 by moving both pairs of linkages 46 in unison. The arms 23 could also be pivotably connected to the remainder of the frame 22 at a pivot points P (FIGS. 1 and 2) to allow the arms 23 to fold up towards the body portion 24 to require less storage space when not in use.

As shown in FIG. 3, the engagement platform 40 is located a distance D1 from a working surface 52 supporting the lift 20 when in the retracted portion. As shown in FIG. 5, the engagement platform 40 is located a distance D2 from the working surface 52 when in the raised position. The distance D2 is greater than the distance D1 to allow the engagement platform 40 to slide under a lower surface of the container 36 (FIG. 8—shown in cross section) in the retracted position and engage the lower surface of the container 36 when in the raised position.

When the engagement platform 40 engages the lower surface of the container 36, a portion of the weight of the container 36 is transferred to the lift 20. The portion of weight transferred may be equal 50% or more of a weight of the lift 20 in one example or greater than or equal the weight of the lift 20 in another example. By transferring a portion of the weight from the container 36 to the lift 20, the drive wheel 28 is able to generate increased traction against the working surface 52. The ability to generate increased traction for the drive wheel 28 improves traction on slippery surfaces, such as on snowy, icy, or wet surfaces. Additionally, because the weight of the lift 20 is a significant factor in the amount of traction that can be generated, the weight transfer from the container 36 allows the weight of the lift 20 to be reduced while still providing sufficient traction to move the container 36. The reduction in weight of the lift 20 allows a single user to load and unload the lift 20 from a vehicle when traveling between multiple containers 36 at remote locations.

The backrest assembly 34 includes a backrest support 56 that is moveable between an extended position, as shown in FIG. 3, and a retracted position, as shown in FIG. 5. The backrest support 56 is mechanically connected to a backrest actuator 54 located in the body portion 24 to move the backrest support 56 to multiple positions between the fully extended position and the fully retracted position. The backrest support 56 engages the container 36 to provide additional stability when the platform lifting assembly 32 is engaging the container 36 to reduce relative movement between the lift 20 and the container 36 about the engagement platform 40. The backrest actuator 54 positions the backrest support 56 in a linear manner through at least one of a spring, a ratchet, a mechanical driver, or an electromechanical driver. In the illustrated example, the backrest support 56 includes a portion that engages the container 36 and extends in a first plane and the engagement platform 40 extends in a second plane perpendicular to the first plane.

Figure 6:
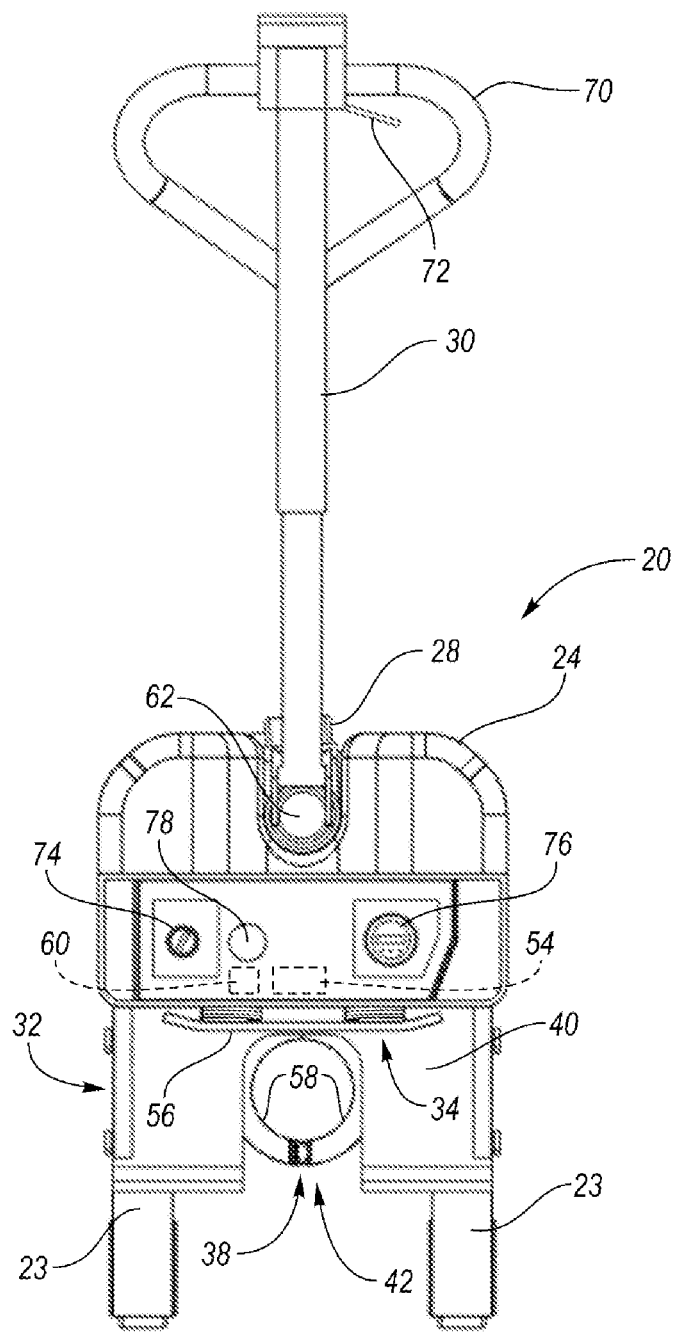
FIG. 6 illustrates a top view of the container moving lift of FIG. 1 with a grabbing mechanism in an extended position.

As shown in FIGS. 4 and 6, the grabbing mechanism 38 is located below a cutout 42 in the engagement platform 40. The cutout 42 allows the engagement platform 40 to surround a wheel 44, such as a caster, on the container 36 (FIG. 8) when securing the container 36 to the lift 20. The cutout 42 also allows the lift 20 to improve the stability of the container 36 if the wheel 44 surrounded by the grabbing mechanism 38 is damaged such that it inhibits the container 36 from rolling properly.

The grabbing mechanism 38 includes at least one arm 58, such as a single arm or a pair of semi-circular grabbing arms, that moves between a retracted position spaced from the cutout 42, as shown in FIG. 4, to an extended position, as shown in FIG. 6, at least partially forming an enclosure with the at least one arm 58. When the at least one arm 58 is in the extended position, it can surround one of the wheels 44 on the container 36 to secure the lift 20 to the container 36. An additional feature of the at least one arm 58 is to secure the lift 20 to the container 36 when moving along an inclined surface. A grabbing actuator 60 located in the body portion 24 moves the at least one arm 58 between the retracted and extended position through one of a mechanical or an electromechanical driver.

As shown in FIGS. 3 and 5, the tiller arm 30 is connected to the drive wheel 28 through a swivel post 62 that swivels about a steering axis A. The swivel post 62 allows the drive wheel 28 to follow a rotational position of the tiller arm 30 about the steering axis A. Additionally, the tiller arm 30 can pivot about a pivot attachment 63 to the swivel post 62 to vary a height of a handle 70 on the tiller arm 30 from the working surface 52 to accommodate varying user heights. The tiller arm 30 can also telescope to further accommodate a relatively tall or a relatively short user. The ability to telescope or fold the tiller arm 30 also allows the lift 20 to require less spaced to store on a vehicle for transport.

The drive wheel 28 includes a motor 64, such as a hub mounted electric motor, that is in electrical communication with a battery 66 and a controller 68 each located at least partially within the body portion 24. The handle 70 of the tiller arm 30 can include a directional input 72 (FIG. 6), such as a lever or trigger, that is in electrical communication with the controller 68 to control a direction and/or a speed of rotation of the drive wheel 28. The ability to control the drive wheel 28 allows the user of the lift 20 to reduce physical energy exerted to move the container 36 and rely upon the force generated by the motor 64 rotating the drive wheel 28 to move the container 36. The reduction in physical energy exerted can reduce potential injuries to the user and allow the user to move containers 36 that would otherwise be too large or heavy to move alone.

The controller 68 can also communicate with an on/off switch 74, a battery energy level monitor 76, and/or a quick shutoff 78 each located on an upper portion of the body portion 24 (FIGS. 4 and 6). The quick shutoff 78 allows a user or another person in the vicinity of the lift 20 to quickly engage the button to stop the lift 20 from operating further under the power of the drive wheel 28.

Figure 7:
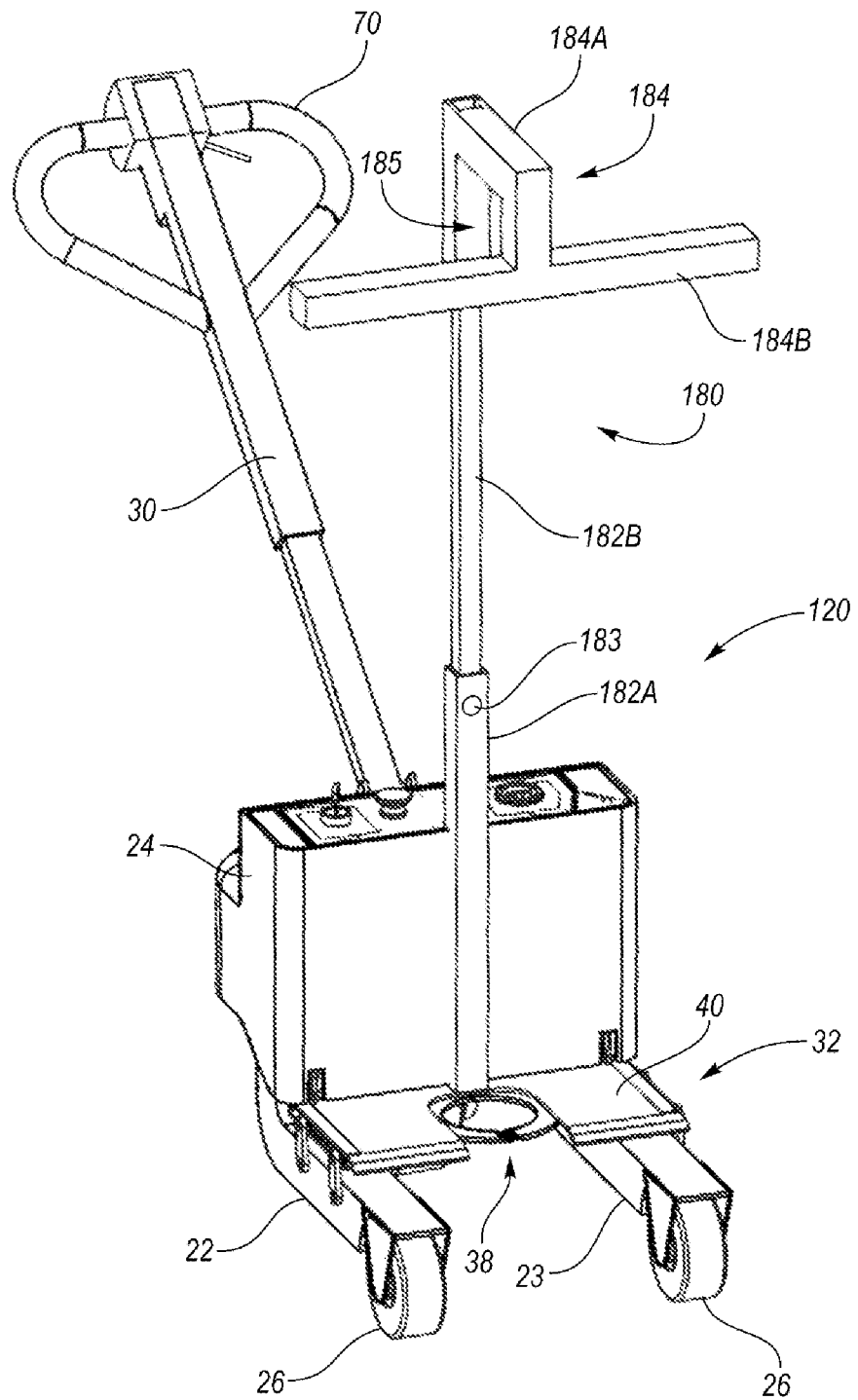
FIG. 7 illustrates a perspective view of another example container moving lift having a retention member.

FIG. 7 illustrates another example lift 120. The lift 120 is similar to the lift 20 except where described below or shown in the Figures with similar numbers used between the lift 20 and the lift 120. In the illustrated example, the lift 120 includes a retention member 180 fixed relative to the frame 22 in place of the backrest assembly 34. However, the lift 120 could include the backrest assembly 34 in addition to the retention member 180. The retention member 180 includes a pair of telescoping arms 182A, 182B that allow a height of a retainer 184 to vary. The arms 182A, 182B telescope by allowing the arm 182A to fit within the arm 182B. A locking mechanism 183, such as a screw lock, button, or pin, may be used to fix the arms 182A, 182B relative to each other to set a vertical height of the retainer 184.

Figure 8:
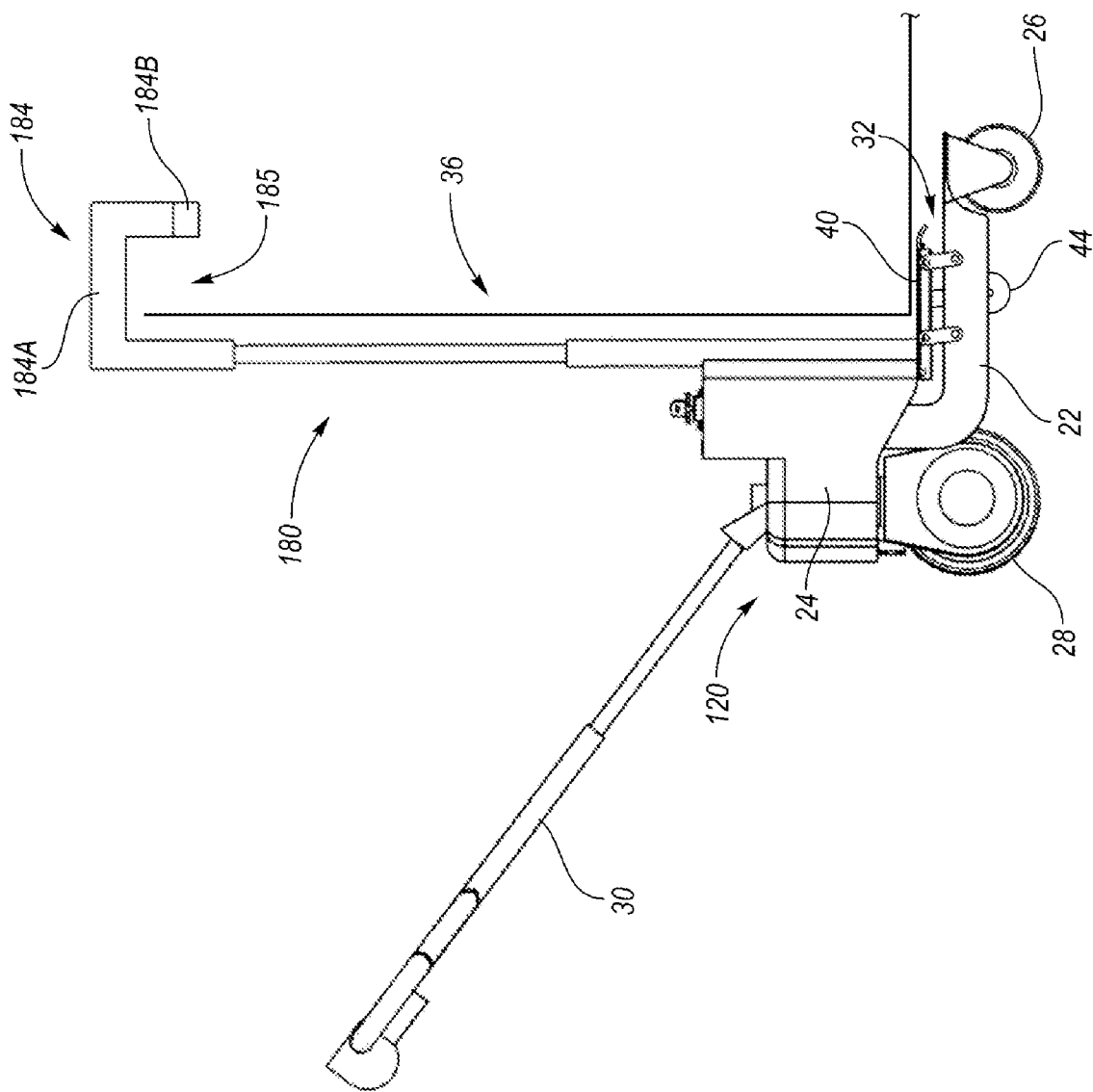
FIG. 8 illustrates a side view of the container moving lift of FIG. 7 with a container in cross section.

As show in FIGS. 7 and 8, the retainer 184 forms a U-shaped recess 185 for accepting an upper edge of the container 36. The retainer 184 includes a U-shaped portion 184A that extends from the telescoping arm 182B to a cross member 184B which extends perpendicular to the U-shaped portion 184A. An upper edge of the container 36 fits within the U-shaped portion 184A and the cross member 184B extends across and can engage an interior surface of the container 36. One feature of the retention member 180 with the retainer 184 is an improved connection between the lift 120 and the container 36 to reduce relative movement between the structures.

Figure 9:
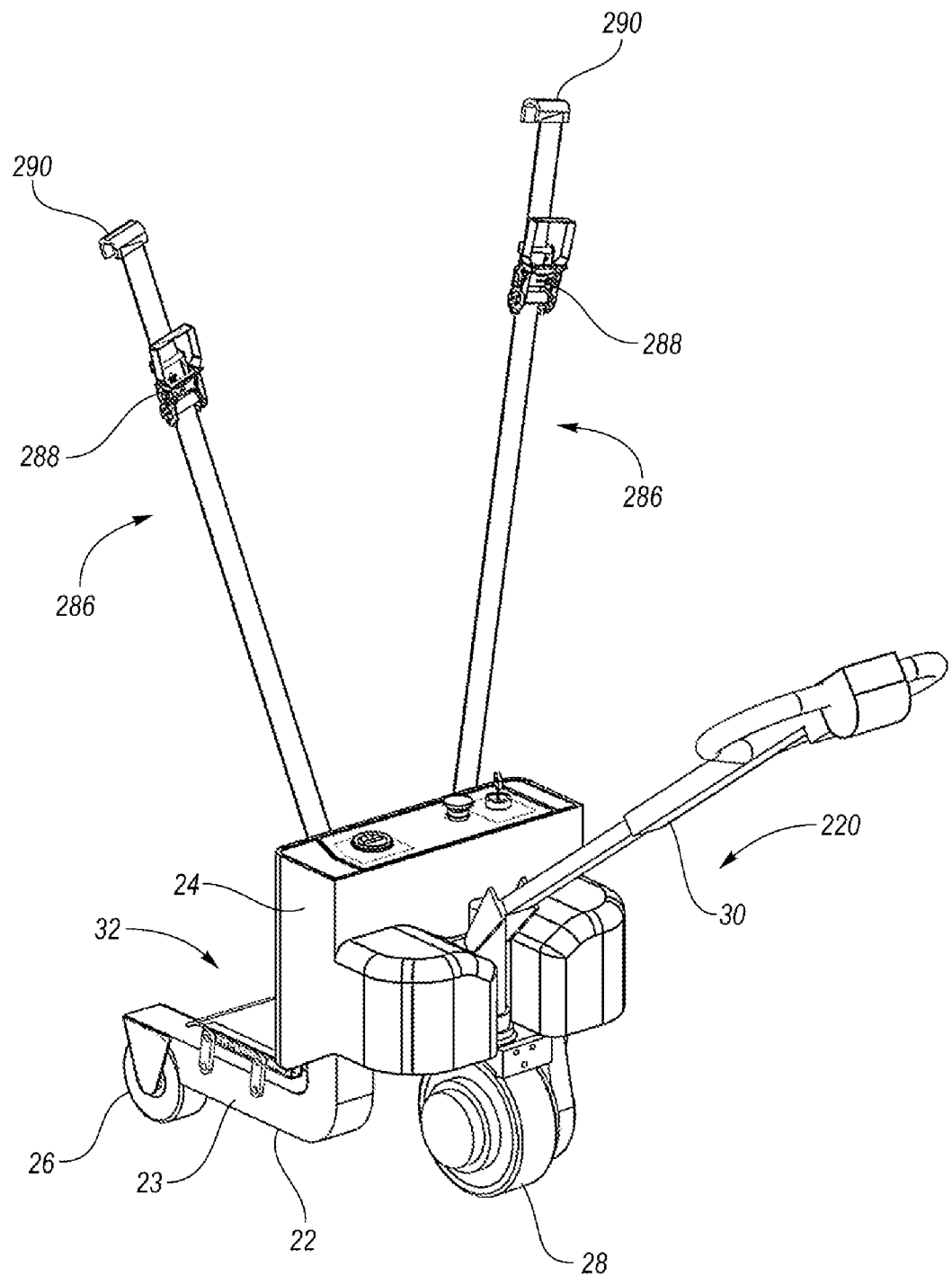
FIG. 9 illustrates a perspective view of yet another example container moving lift with straps.
Figure 10:
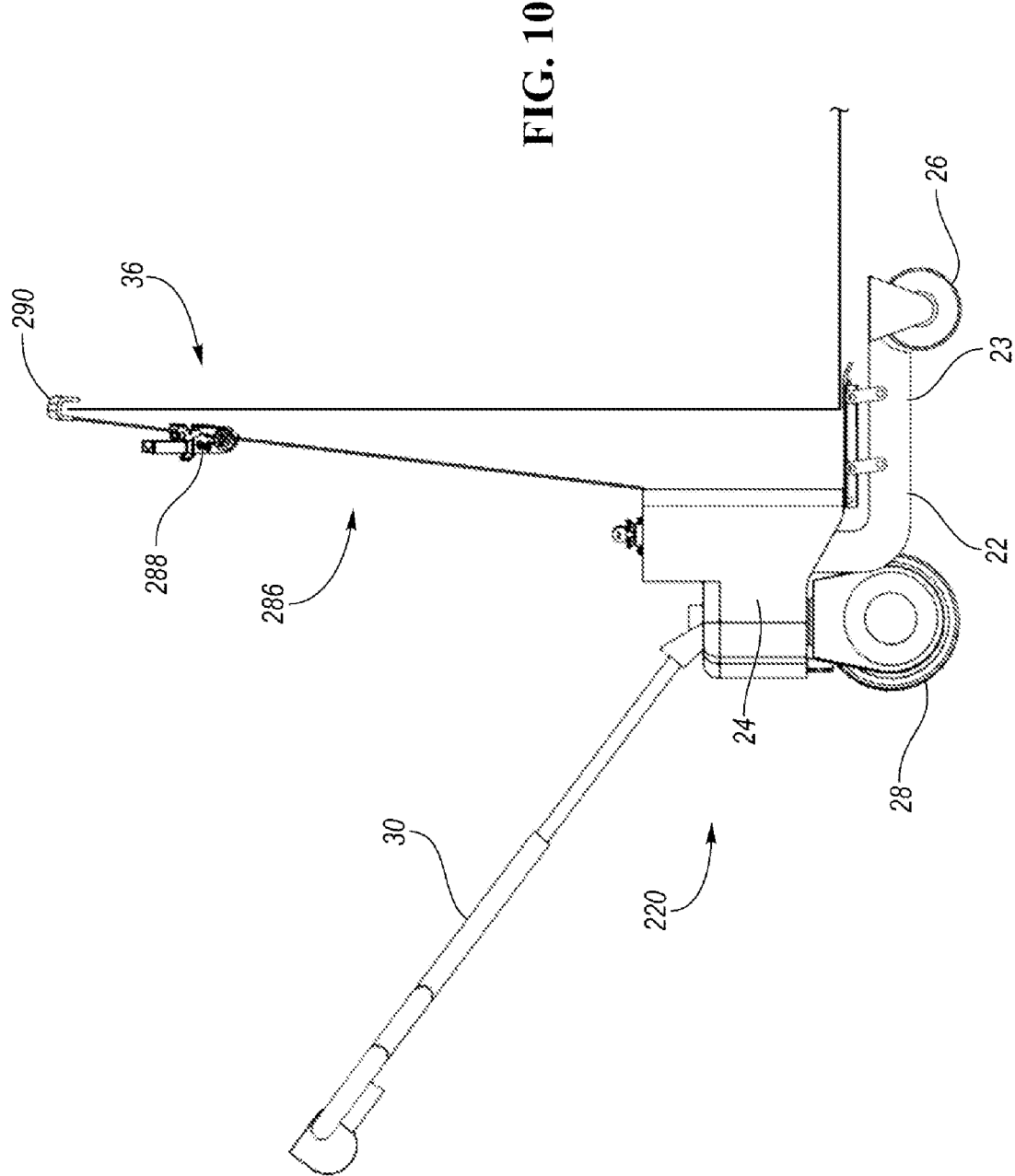
FIG. 10 illustrates a side view of the container moving lift of FIG. 9 with a container in cross section.

FIGS. 9 and 10 illustrate another example lift 220 similar to the lift 20 except where described below or shown in the Figures with similar numbers used between the lift 20 and the lift 220. In the illustrated example, the lift 220 includes a pair of ratcheting straps 286 fixed relative to the frame 22 in place of the backrest assembly 34. However, the lift 220 could include the backrest assembly 34 in addition to the ratcheting straps 286. The pair of ratcheting straps 286 are fixed at one end relative to the frame 22. Each of the ratcheting straps 286 includes a ratchet 288 that can be tightened to secure a retention hook 290, or retention member, to an upper edge of the container 36, as shown in FIG. 10. The retention hooks 290 can be positioned relative to a front edge or a side edge of the container 36 to provide an improved connection between the lift 220 and the container 36.

Figure 11:
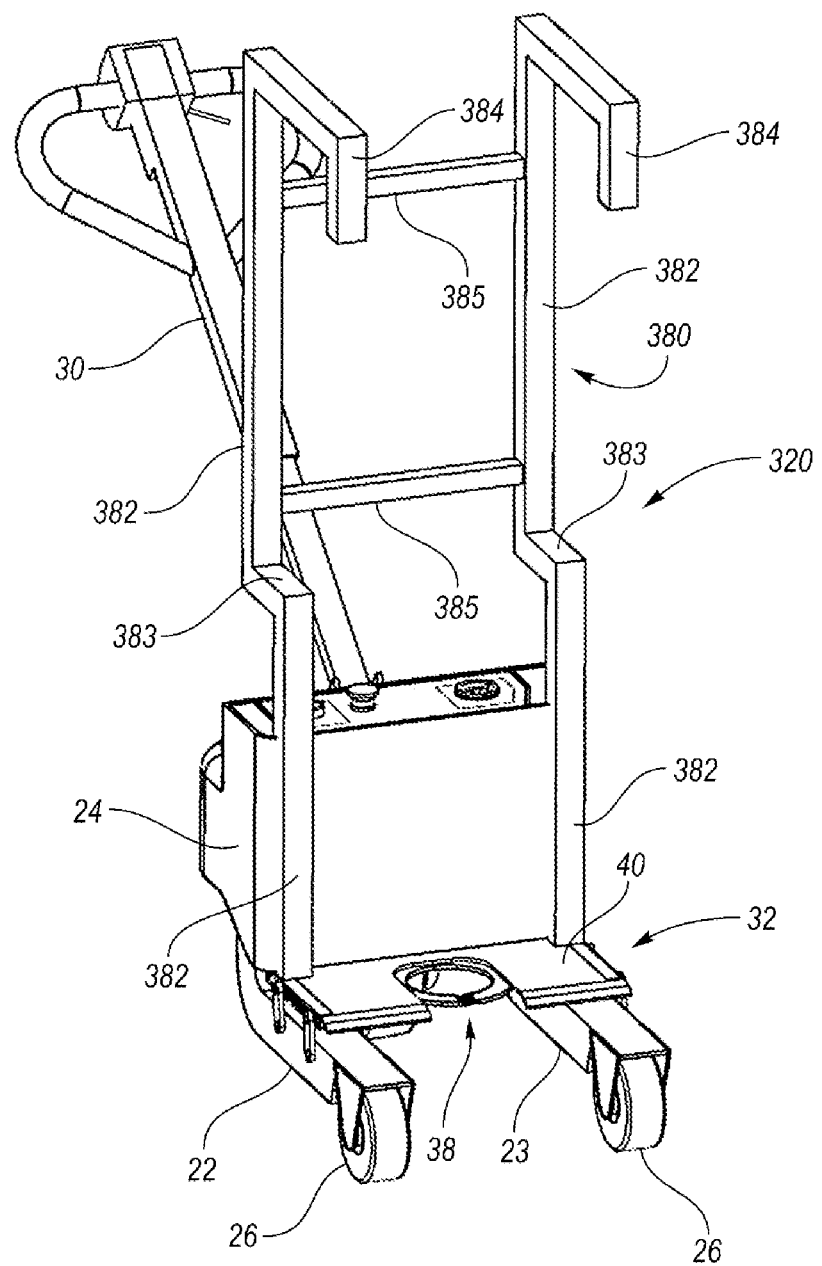
FIG. 11 illustrates a perspective view of a further example container moving lift with another example retention member.
Figure 12:
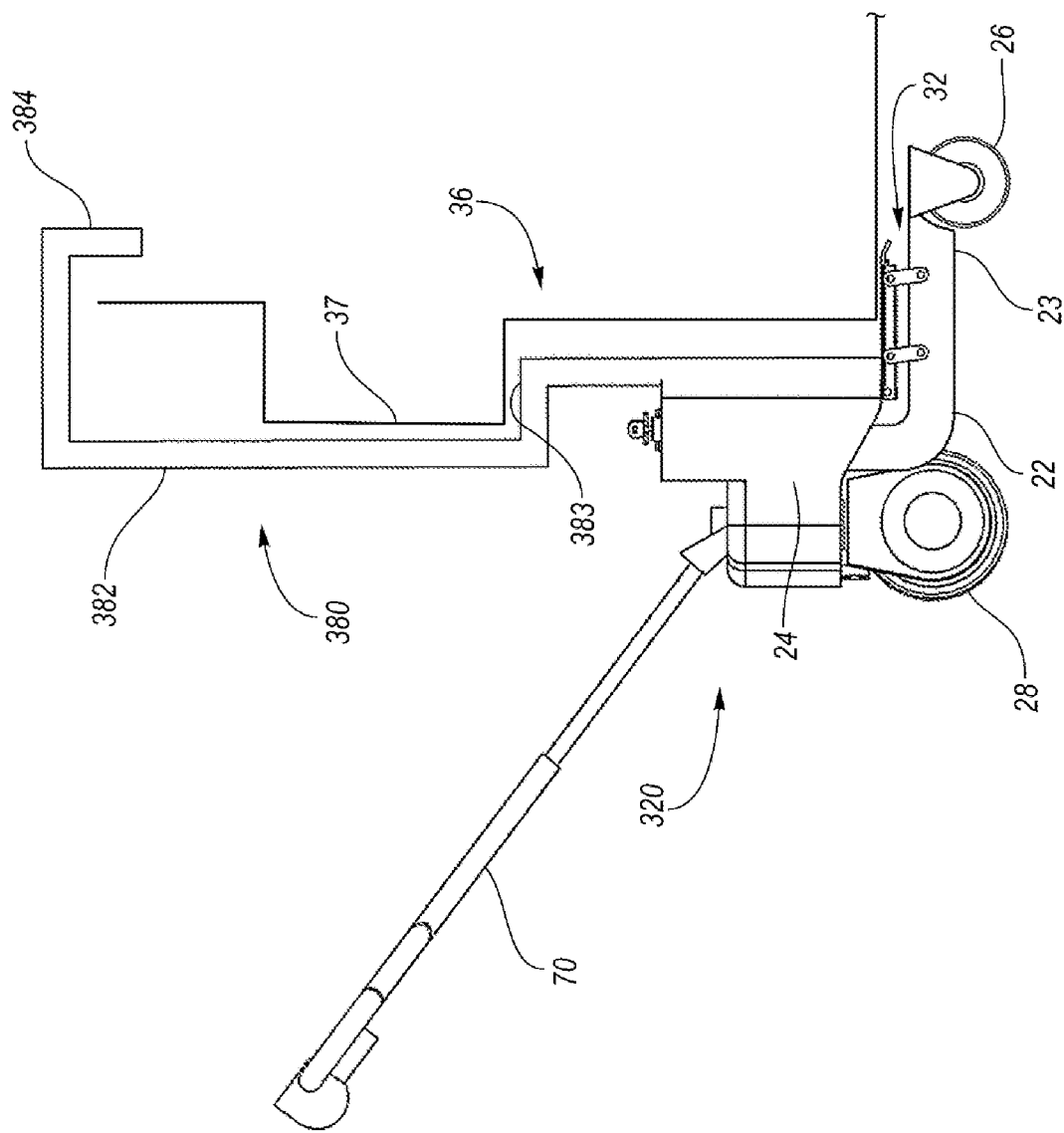
FIG. 12 illustrates a side view of the container moving lift of FIG. 11 with a container in cross section.

FIGS. 11 and 12 illustrate yet another example lift 320 similar to the lift 20 except where described below or shown in the Figures with similar numbers used between the lift 20 and the lift 320. In the illustrated example, the lift 320 includes a retention member 380 fixed relative to the frame 22 in place of the backrest assembly 34. However, the lift 320 could include the backrest assembly 34 in addition to the retention member 380. The retention member 380 includes a pair of arms 382 fixed to the frame 22 of the lift 320. The arms 382 include a ledge 383 for accepting a protrusion 37 on the container 36. In one example, the protrusion 37 may include a sleeve or lid actuating member attached to an exterior surface of the container 36. Each of the arms 382 form a retention member and includes a retainer 384 forming a U-shape that surrounds an upper edge of the container 36. Additionally, a pair of stabilizing arms 385 extend between adjacent arms 382 to secure the arms 382 relative to each other.

When using the lift 320 with the container 36, the upper edge of the container 36 fits under the retainers 384 when the platform lifting assembly 32 is in the retracted or lowered position. However, when the platform lifting assembly 32 raises the engagement platform 40, a portion of the retainers 384 will extend around the upper edge of the container 36 to prevent or reduce movement between the lift 320 and the container 36.

Figure 13:
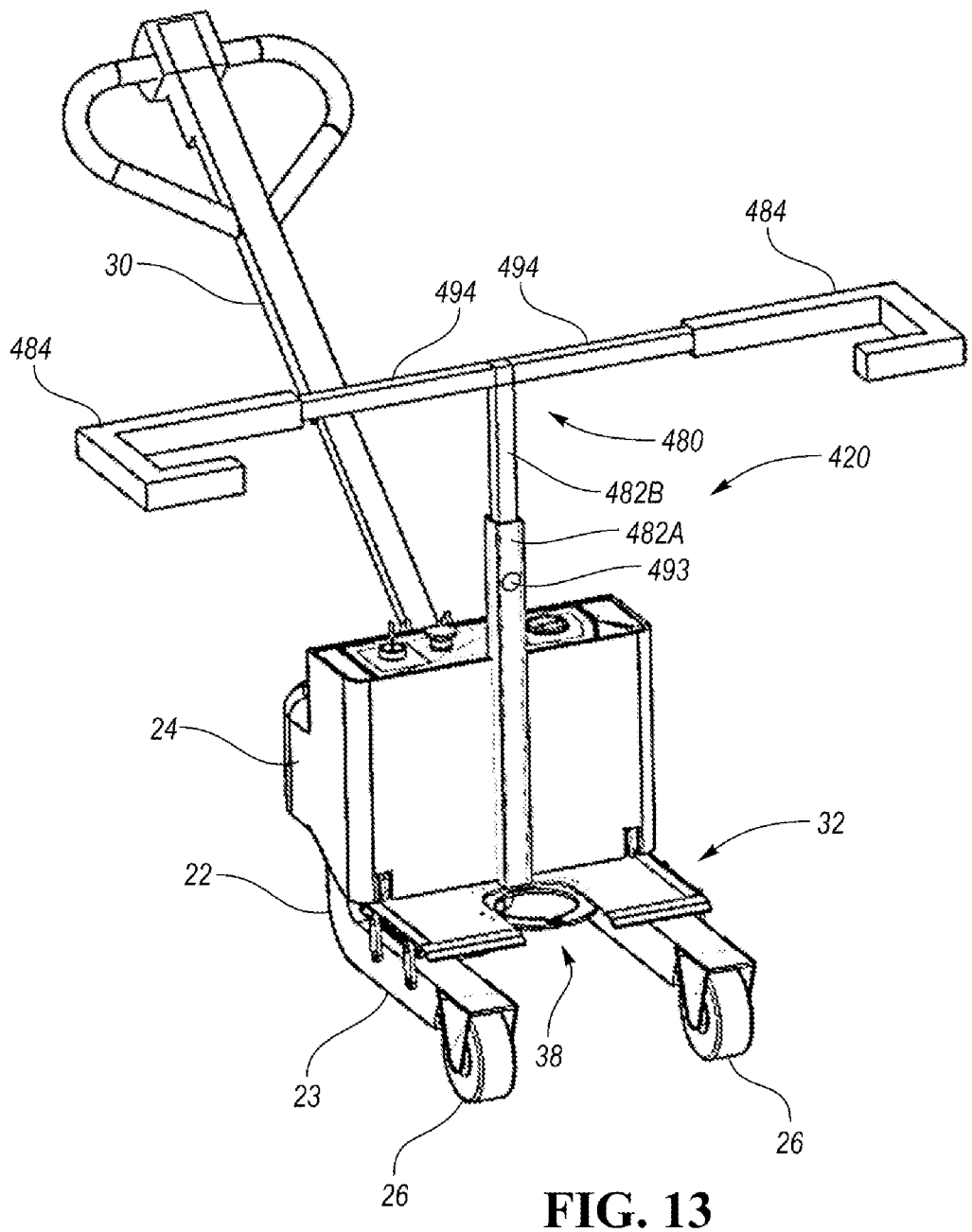
FIG. 13 illustrates a perspective view of still a further example container moving lift with a pair of retainers.
Figure 14:
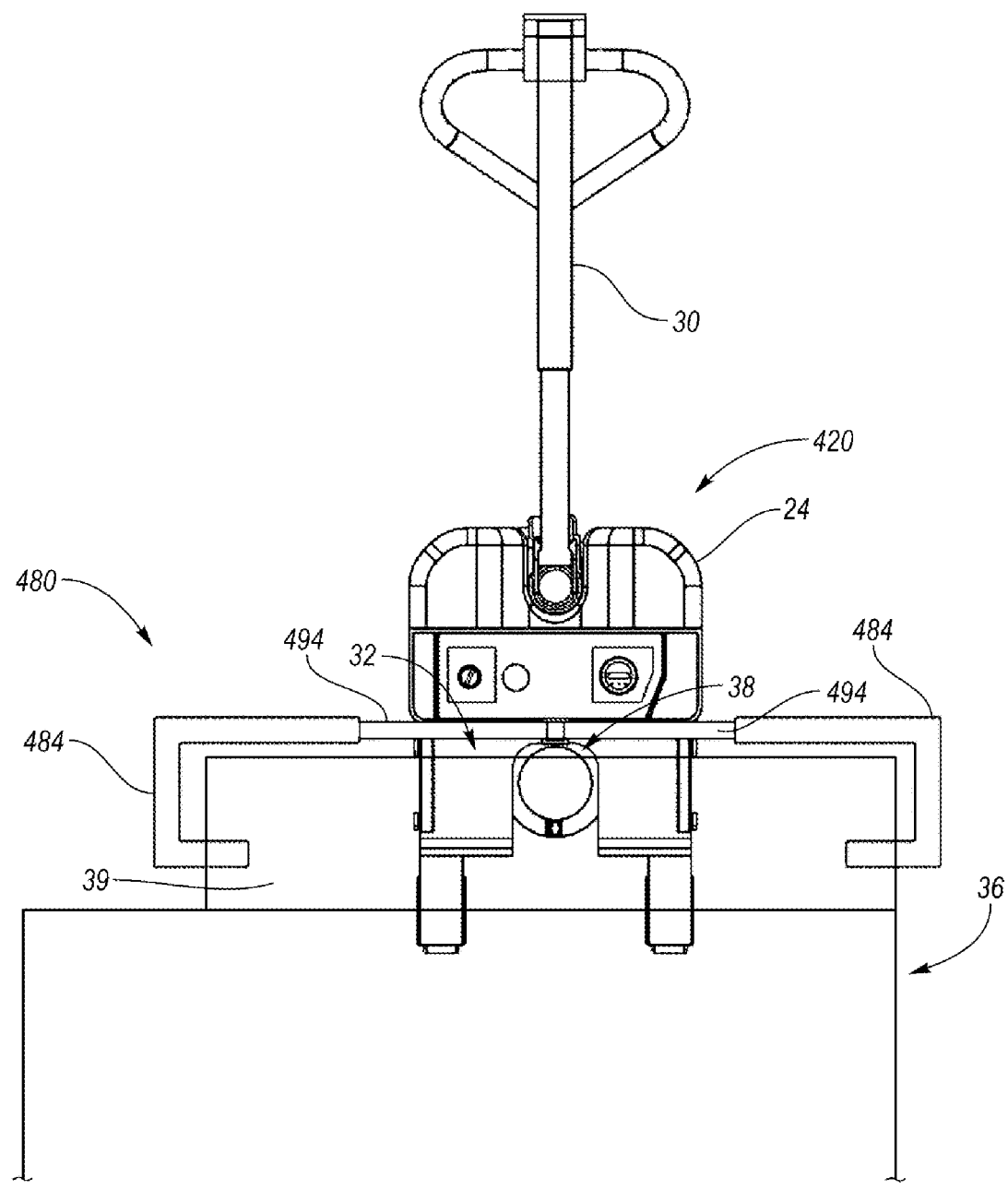
FIG. 14 illustrates a top view of the container moving lift of FIG. 13 with a container.

FIGS. 13 and 14 illustrate yet another example lift 420 similar to the lift 20 except where described below or shown in the Figures with similar numbers used between the lift 20 and the lift 420. In the illustrated example, the lift 420 includes a retention member 480 fixed relative to the frame 22 in place of the backrest assembly 34. However, the lift 420 could include the backrest assembly 34 in addition to the retention member 480. The retention member 480 includes a pair of telescoping arms 482A, 482B that adjust a vertical position of a pair of retainers 484. The arms 482A, 482B telescope by allowing the arm 482A to fit within the arm 482B. A locking mechanism 493, such as a screw lock, may be used to fix the arms 482A, 482B relative to each other to determine a vertical height of the retention member 480.

The pair of retainers 484 telescope on arms 494 that are positioned horizontally from a distal end of the arm 482B. Once the pair of retainers 484 are aligned with a sleeve 39 on a side on the container 36, the pair of retainers 484 slide on arms 494 inward to fit within the sleeve 39 on the container 36. The pair of retainers 484 on the retention member 480 prevent relative movement between the lift 420 and the container 36.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A container moving assembly comprising:
a frame;
a drive wheel pivotably attached to the frame about a steering axis;
a tiller arm connected to the drive wheel and configured to pivot the drive wheel about the steering axis;
a pair of guide wheels rotatably attached relative to the frame opposite the drive wheel; and
a platform lifting assembly pivotable relative to the frame having an engagement platform for supporting a container.

2. The assembly of claim 1, wherein the engagement platform is supported by at least one pair of linkages relative to the frame.

3. The assembly of claim 2, wherein the at least one pair of linkages form a four-bar linkage with the frame and the engagement platform for pivotably connecting the engagement platform to the frame.

4. The assembly of claim 3, wherein the at least one pair of linkages includes two pair of linkages with one pair of linkages located adjacent opposing edges of the platform.

5. The assembly of claim 1, wherein the frame includes a pair of arms with a guide wheel located at a distal end of each arm.

6. The assembly of claim 5, wherein the engagement platform includes a cutout portion located between the pair of arms on the frame, wherein the cutout is open toward a distal end of the engagement platform.

7. The assembly of claim 6, wherein at least one grabber arm is located adjacent the cutout for engaging a wheel on a container, wherein the at least one grabber arm is movable between a retracted position and an extended position in which the at least one grabber arm at least partially encloses a portion of the cutout to retain the wheel therein.

8. The assembly of claim 6, wherein the cutout extends for over 50% of a depth of the engagement platform.

9. The assembly of claim 1, including a mechanical actuator configured to pivot the engagement platform between a retracted position and an extending position.

10. The assembly of claim 1, wherein the pair of guide wheels freely rotate relative to the frame.

11. The assembly of claim 1, including a backrest assembly having a backrest support having a container contact surface mechanically attached to a backrest actuator for moving the backrest between an extended and retracted position.

12. The assembly of claim 11, wherein the backrest support includes a portion that extends in a first plane and the engagement platform extends in a second plane and perpendicular to the first plane.

13. The assembly of claim 1, including at least one retention member fixed relative to the frame including a retainer.

14. The assembly of claim 1, wherein the drive wheel is driven by a hub mounted electric motor.

15. The assembly of claim 1 in combination with a container, wherein the container is supported on the engagement platform, wherein only one upright wall of the container is on the engagement platform.

16. The combination of claim 15 wherein the frame includes a pair of arms with a guide wheel located at a distal end of each arm, wherein the engagement platform includes a cutout portion located between the pair of arms on the frame, wherein at least one grabber arm is located adjacent the cutout, and wherein the at least one grabber arm is movable between a retracted position and an extended position in which the at least one grabber arm at least partially encloses a portion of the cutout.

17. A container moving assembly comprising:
a frame defining a cutout opening toward a distal end;
at least one arm located adjacent the cutout and configured to engage a wheel on a container, wherein the at least one arm is movable between a retracted position and an extended position in which the at least one arm at least partially encloses a portion of the cutout to retain the wheel therein;
a drive wheel pivotably attached to the frame about a steering axis at a proximal end of the frame;
a tiller arm connected to the drive wheel and configured to pivot the drive wheel about the steering axis;
a pair of guide wheels below a distal end of the frame;
an engagement platform for supporting a portion of the container thereon, wherein the engagement platform is movable between a lowered position to disengage from the container and a raised position to engage the container; and
an actuator for moving the engagement platform between the lowered position and the raised position.

18. The assembly of claim 17 in combination with a container, wherein the container is supported on the engagement platform, wherein only one upright wall of the container is on the engagement platform.

19. A method for operating a lift for a container comprising:
locating a portion of the lift under only one upright wall of the container;
moving a platform lift assembly between a retracted position and an extended position to engage the container; and
moving the container with assistance of a drive wheel pivotably attached to a frame of the lift about a steering axis.

20. The method of claim 19, wherein moving a container lift assembly between the retracted position and the extended position to engage the container includes transferring a portion of the weight, but not all of the weight, of the container to the lift.

21. The method of claim 19, wherein an upper surface of the lift includes an engagement platform on a platform lifting assembly.

22. The method of claim 21, wherein the engagement platform is supported by at least one pair of linkages relative to the frame and the at least one pair of linkages form a four-bar linkage with the frame and the engagement platform.

23. The method of claim 19, including engaging a wheel assembly on the container with at least one grabber arm on the lift to secure the container relative to the lift.

24. The method of claim 19 wherein the container is a dumpster.

* * * * *